US012140285B2

(12) United States Patent
Artner et al.

(10) Patent No.: US 12,140,285 B2
(45) Date of Patent: Nov. 12, 2024

(54) METHOD FOR FASTENING A COVER PLATE FOR A MOTOR VEHICLE HEADLAMP TO A MOTOR VEHICLE HEADLAMP HOUSING

(71) Applicant: ZKW Group GmbH, Wieselburg (AT)

(72) Inventors: Martin Artner, Maria Tafler (AT); Markus Bemmerl, Loosdorf (AT); Markus Huber, Neumarkt an der Ybbs (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/278,906

(22) PCT Filed: Jan. 24, 2022

(86) PCT No.: PCT/EP2022/051478
§ 371 (c)(1),
(2) Date: Aug. 25, 2023

(87) PCT Pub. No.: WO2022/179777
PCT Pub. Date: Sep. 1, 2022

(65) Prior Publication Data

US 2024/0133533 A1 Apr. 25, 2024
US 2024/0230050 A9 Jul. 11, 2024

(30) Foreign Application Priority Data

Feb. 26, 2021 (EP) .................................... 21159583

(51) Int. Cl.
*F21S 41/29* (2018.01)
*F21S 41/20* (2018.01)

(52) U.S. Cl.
CPC ............... *F21S 41/29* (2018.01); *F21S 41/28* (2018.01); *F21S 41/2805* (2024.05)

(58) Field of Classification Search
CPC .......... F21S 41/28; F21S 41/285; F21S 41/29; F21S 41/295; F21S 41/275; F21S 41/255;
(Continued)

(56) References Cited

U.S. PATENT DOCUMENTS 4,498,124 A * 2/1985 Mayer ..................... F21S 41/55 362/240
6,244,732 B1 * 6/2001 Futami ...................... F21V 5/04 362/328
(Continued)

FOREIGN PATENT DOCUMENTS

EP 2194311 A2 * 6/2010 .......... F21S 48/1154

OTHER PUBLICATIONS

Search English translation of EP 2194311 A2 (Year: 2010).*
(Continued)

*Primary Examiner* — Omar Rojas Cadima
(74) *Attorney, Agent, or Firm* — Eversheds Sutherland (US) LLP

(57) ABSTRACT

Method for attaching a lens (100) for a motor vehicle headlight (10) to a motor vehicle headlight housing (200), comprising the following steps in chronological order:

Figure 1:
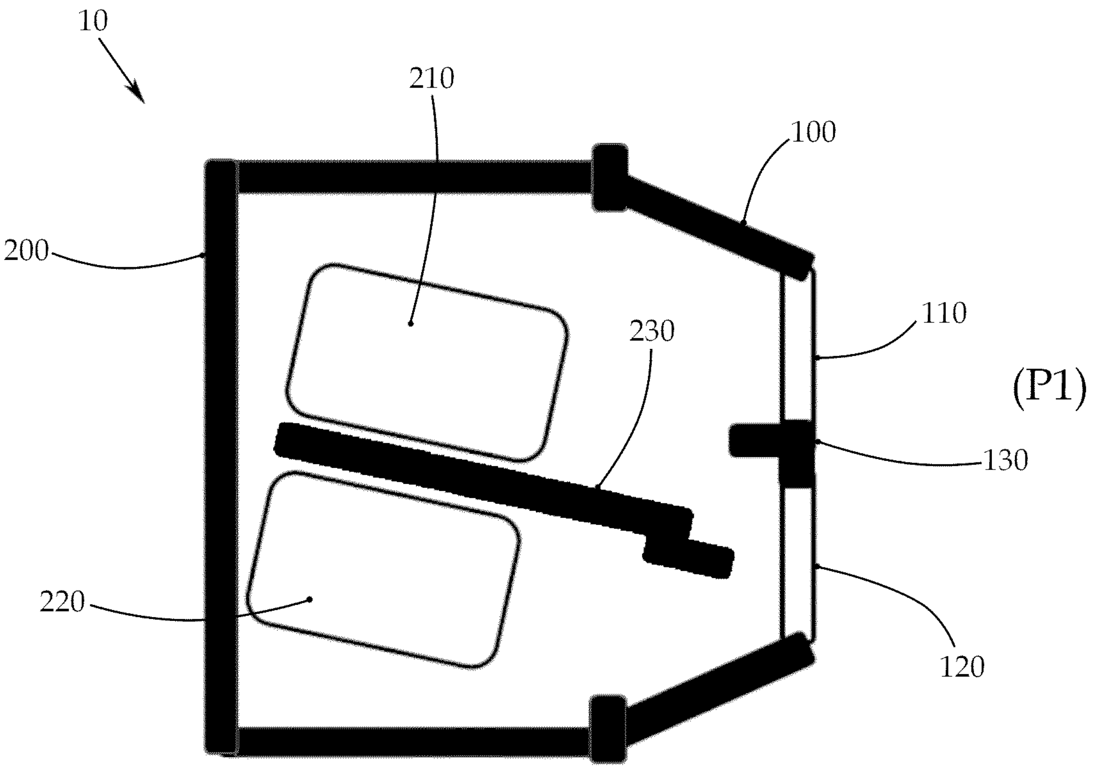

a. providing a motor vehicle headlight housing (200), wherein the following is arranged in the motor vehicle headlight housing (200):
   a first light module (210) and a second light module (220),
   a screen (230), wherein the first and second light module (210, 220) as well as the screen (230) form an assembly, and providing a lens (100), which has a first projection section (110) and a second projection section (120), wherein the first projection section (110) in combination with the first light module (210) is designed to produce a first light distribution, and wherein the second projection section (120) in combination with the second light module (220) is designed to produce a second light distribution, wherein the lens (100) has an opaque section (130), b. transferring the assembly into the mounting position (P1) with respect to the motor vehicle headlight housing (200), (Continued)

c. transferring the lens (100) onto the motor vehicle headlight housing (200) in a fixing position and subsequently fixing the lens (100) to the motor vehicle headlight housing (200) by means of vibration welding,
d. transferring the assembly into the end position (P2).

3 Claims, 1 Drawing Sheet

(58) Field of Classification Search
CPC ........... F21W 2102/19; F21W 2102/40; F21W 2103/60
See application file for complete search history.

(56) References Cited

U.S. PATENT DOCUMENTS

| | | | | |
|---|---|---|---|---|
| 2006/0285348 | A1 | 12/2006 | Valcamp et al. | |
| 2009/0097247 | A1 | 4/2009 | Tseng et al. | |
| 2012/0201043 | A1 | 8/2012 | DiPenti et al. | |
| 2017/0234503 | A1 * | 8/2017 | Buffone ................ | F21S 41/148<br>362/509 |

OTHER PUBLICATIONS

Extended European Search Report for European Patent Application No. 21159583.0, dated Jul. 26, 2021 (5 Pages).
International Search Report and Written Opinion for PCT Application No. PCT/EP2022/051478, dated Apr. 12, 2022 (12 Pages).

* cited by examiner

METHOD FOR FASTENING A COVER PLATE FOR A MOTOR VEHICLE HEADLAMP TO A MOTOR VEHICLE HEADLAMP HOUSING

The invention relates to a method for attaching a lens for a motor vehicle headlight to a motor vehicle headlight housing.

A lens for a motor vehicle headlight is attached to a designated motor vehicle headlight housing in the prior art by means of vibration welding, wherein it must be ensured that a minimum distance is maintained in all spatial planes between parts that are not to be welded.

In particular, headlights that are to intended to produce at least two light functions or light distributions are designed in such a way that an at least optically closed-off chamber is ideally provided for each light function.

However, the abovementioned condition in relation to vibration welding creates a problem when headlights have little installation space available, which is the case, for example, with combination rear lights, which are intended to produce one or more turn signal light distributions, as in particular dividers or screens, which are intended to seal off the individual light modules for producing the light distributions or light functions, can no longer fulfil their function due to the minimum distance required for vibration welding. This results in unwanted stray light.

It is an object of the invention to provide an improved method for attaching a lens for a motor vehicle headlight to a motor vehicle headlight housing.

This object is achieved by virtue of the fact that the method mentioned comprises the following steps in chronological order:

a. providing a motor vehicle headlight housing, wherein the following is arranged in the motor vehicle headlight housing:
   - a first light module, which helps produce a first light distribution,
   - a second light module, which helps produce a second light distribution,
   - a screen, which is arranged between the first and second light module, wherein the screen is arranged in such a manner that light emitted by one of the light modules is prevented from directly entering another light module,
   - a holding body, on which the first and second light module as well as the screen are arranged, wherein the holding body, the first and the second light module as well as the screen form an assembly, and wherein the assembly in the motor vehicle headlight housing can be moved into a mounting position and into an end position that is different from the mounting position, and providing a lens, which has a first projection section and a second projection section, which first and second projection section are at least partially translucent, wherein the first projection section is associated with the first light module and in combination with the first light module is designed to produce the first light distribution, and wherein the second projection section is associated with the second light module and in combination with the second light module is designed to produce the second light distribution, wherein the lens has an opaque section, which is arranged between the first and second projection section and is designed to optically and spatially separate the first and second projection section from one another such that the light entering a projection section is prevented from entering the other projection section, b. transferring the assembly into the mounting position with respect to the motor vehicle headlight housing, wherein in the mounting position, the assembly is pre-positioned in such a way that the screen is free from mechanical contact with the opaque section of the lens during the subsequent fixing of the lens in a fixing position to the motor vehicle headlight housing in accordance with step c),
c. transferring the lens onto the motor vehicle headlight housing in the fixing position and subsequently fixing the lens to the motor vehicle headlight housing by means of vibration welding,
d. transferring the assembly into the end position, wherein in the end position, the assembly is arranged in such a manner that the screen extends continuously to the opaque section and is in mechanical contact with the opaque section of the lens such that light from one light module is prevented from entering a projection section of the lens associated with the other light module.

It can be provided that the assembly is transferred into the mounting position in step b) and into the end position in step c) with adjusting screws.

It can be provided that the adjusting screws are accessible from outside of the motor vehicle headlight housing.

The invention is explained below in more detail based on exemplary drawings. In the drawings, FIG. 1 shows a motor vehicle headlight with a motor vehicle headlight housing and an assembly in the housing, made up of a first and second light module as well as a screen, wherein the assembly is shown in a mounting position for fixing a lens to the motor vehicle headlight housing, and FIG. 2 shows the motor vehicle headlight from FIG. 1, wherein the assembly is shown in an end position with a fixed lens.

Figure 2:
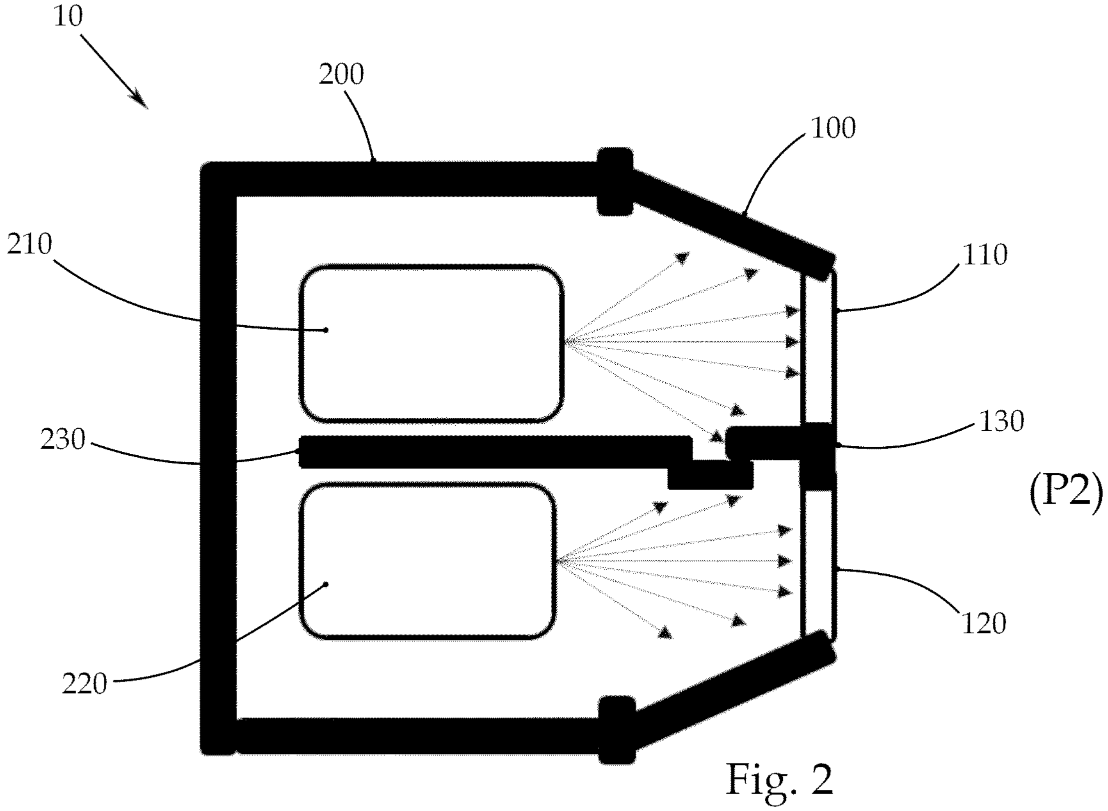

FIG. 1 and FIG. 2 together show a method for attaching a lens 100 for a motor vehicle headlight 10 to a motor vehicle headlight housing 200, wherein in a first step a), a motor vehicle headlight housing 200 is provided, wherein a first light module 210, which helps produce a first light distribution, and a second light module 220, which helps produce a second light distribution, are arranged in the motor vehicle headlight housing 200.

The motor vehicle headlight housing 200 further comprises a screen 230, which is arranged between the first and second light module 210, 220, wherein the screen 230 is arranged in such a manner that light emitted by one of the light modules 210, 220 is prevented from directly entering another light module.

Moreover, a holding body is provided, on which the first and second light module 210, 220 as well as the screen 230 are arranged, wherein the holding body, the first and the second light module 210, 220 as well as the screen 230 form an assembly, and wherein the assembly in the motor vehicle headlight housing 200 can be moved into a mounting position P1 and into an end position P2 that is different from the mounting position P1.

Furthermore, a lens 100 is provided, which has a first projection section 110 and a second projection section 120, which first and second projection section 110, 120 are at least partially translucent, wherein the first projection section 110 is associated with the first light module 210 and in combination with the first light module 210 is designed to produce the first light distribution, and wherein the second projection section 120 is associated with the second light module 220 and in combination with the second light module 220 is designed to produce the second light distribution.

The lens 100 further has an opaque section 130, which is arranged between the first and second projection section 110, 120 and is designed to optically and spatially separate the first and second projection section 110, 120 from one another such that the light entering a projection section is prevented from entering the other projection section.

In a next step b), the assembly is transferred into the mounting position P1 with respect to the motor vehicle headlight housing 200, which mounting position P1 is shown in FIG. 1, wherein in the mounting position P1, the assembly is pre-positioned in such a way that the screen 230 is free from mechanical contact with the opaque section 230 of the lens 100 during the subsequent fixing of the lens 100 in a fixing position to the motor vehicle headlight housing 200 in accordance with step c), i.e. the screen 230 does not come into contact with the opaque section 130 of the lens 100 when the lens 100 is applied to the motor vehicle headlight housing 200 for fixing.

The lens 100 is then transferred in a step c) onto the motor vehicle headlight housing 200 in the fixing position and then fixed to the motor vehicle headlight housing 200 by means of vibration welding.

In a subsequent step d), the assembly is transferred into the end position P2, which end position P2 is shown in FIG. 2, wherein in the end position P2, the assembly is arranged in such a manner that the screen 230 extends continuously to the opaque section 130 and is in mechanical contact with the opaque section 130 of the lens such that light from one light module is prevented from entering a projection section 110, 120 of the lens 100 associated with the other light module.

The assembly is transferred into the mounting position P1 in step b) and into the end position P2 in step c) by means of adjusting screws, which are accessible from outside of the motor vehicle headlight housing 200.

The invention claimed is:

1. A method for attaching a lens (100) for a motor vehicle headlight (10) to a motor vehicle headlight housing (200), comprising the following steps in chronological order:

a. providing a motor vehicle headlight housing (200), wherein the following is arranged in the motor vehicle headlight housing (200):
   - a first light module (210), which helps produce a first light distribution,
   - a second light module (220), which helps produce a second light distribution,
   - a screen (230), which is arranged between the first light module and the second light module (210, 220), wherein the screen (230) is arranged in such a manner that light emitted by one of the light modules (210, 220) is prevented from directly entering another light module,
   - a holding body, on which the first and second light modules (210, 220) and the screen (230) are arranged, wherein the holding body, the first and the second light modules (210, 220), and the screen (230) form an assembly, and wherein the assembly in the motor vehicle headlight housing (200) can be moved into a mounting position (P1) and into an end position (P2) that is different from the mounting position (P1), and providing a lens (100), which has a first projection section (110) and a second projection section (120), which first and second projection sections (110, 120) are at least partially translucent, wherein the first projection section (110) is associated with the first light module (210) and in combination with the first light module (210) is designed to produce the first light distribution, and wherein the second projection section (120) is associated with the second light module (220) and in combination with the second light module (220) is designed to produce the second light distribution, wherein the lens (100) has an opaque section (130), which is arranged between the first and second projection section (110, 120) and is designed to optically and spatially separate the first and second projection section (110, 120) from one another such that the light entering a projection section is prevented from entering the other projection section;

b. transferring the assembly into the mounting position (P1) with respect to the motor vehicle headlight housing (200), wherein in the mounting position (P1), the assembly is pre-positioned in such a way that the screen (230) is free from mechanical contact with the opaque section (130) of the lens (100) during the subsequent fixing of the lens (100) in a fixing position to the motor vehicle headlight housing (200) in accordance with step c);

c. transferring the lens (100) onto the motor vehicle headlight housing (200) in the fixing position and subsequently fixing the lens (100) to the motor vehicle headlight housing (200) by means of vibration welding; and d. transferring the assembly into the end position (P2), wherein in the end position (P2), the assembly is arranged in such a manner that the screen (230) extends continuously to the opaque section (130) and is in mechanical contact with the opaque section (130) of the lens such that light from one light module is prevented from entering a projection section (110, 120) of the lens (100) associated with the other light module.

2. The method according to claim 1, wherein the assembly is transferred into the mounting position (P1) in step b) and into the end position (P2) in step c) with adjusting screws.

3. The method according to claim 2, wherein the adjusting screws are accessible from outside of the motor vehicle headlight housing (200).

* * * * *